(12) United States Patent
Bellmore et al.

(10) Patent No.: US 8,834,977 B2
(45) Date of Patent: Sep. 16, 2014

(54) COEXTRUDED FILM AND BAGS MADE THEREFROM SUITABLE FOR BAG IN BOX CONTAINERS AND METHOD OF MANUFACTURING THE COEXTRUDED FILM

(71) Applicants: David Bellmore, Aurora, IL (US); Karen Berger, Northlake, IL (US); Gail Becke, Mundelein, IL (US)

(72) Inventors: David Bellmore, Aurora, IL (US); Karen Berger, Northlake, IL (US); Gail Becke, Mundelein, IL (US)

(73) Assignee: Scholle Corporation, Irvine, CA (US)

( * ) Notice: Subject to any disclaimer, the term of this patent is extended or adjusted under 35 U.S.C. 154(b) by 0 days.

(21) Appl. No.: 13/657,442

(22) Filed: Oct. 22, 2012

(65) Prior Publication Data

US 2013/0126592 A1 May 23, 2013

Related U.S. Application Data

(60) Provisional application No. 61/549,435, filed on Oct. 20, 2011.

(51) Int. Cl.
*B29D 22/00* (2006.01)
*B65D 5/56* (2006.01)
*B65D 33/00* (2006.01)
*B65D 77/06* (2006.01)
*B32B 1/08* (2006.01)

(52) U.S. Cl.
CPC *B65D 5/56* (2013.01); *B65D 33/00* (2013.01); *B65D 77/062* (2013.01); *B32B 1/08* (2013.01)
USPC ............ 428/34.1; 428/35.5; 525/74; 525/240

(58) Field of Classification Search
CPC ........ B65D 5/56; B65D 33/00; B65D 77/062; B32B 1/08; C09J 7/00; C09J 123/06; C08L 51/06; C08L 51/003; C08F 222/06
USPC ........... 428/34.1, 219, 523, 35.2; 525/74, 240
See application file for complete search history.

(56) References Cited

U.S. PATENT DOCUMENTS

| | | | |
|---|---|---|---|
| 4,755,419 A | 7/1988 | Shah | |
| 6,086,967 A * | 7/2000 | Whiteman et al. | 428/35.7 |
| 6,262,174 B1 * | 7/2001 | Cooper et al. | 525/88 |
| 6,329,465 B1 * | 12/2001 | Takahashi et al. | 525/191 |
| 7,332,121 B2 | 2/2008 | Schlosser et al. | |
| 7,501,168 B2 | 3/2009 | Schiffmann | |
| 7,504,143 B2 | 3/2009 | Schief et al. | |
| 7,560,063 B2 | 7/2009 | Schlosser et al. | |
| 7,727,604 B2 | 6/2010 | Schiffmann | |
| 7,744,806 B2 | 6/2010 | Broadus et al. | |
| 8,153,243 B2 * | 4/2012 | Patel et al. | 428/219 |
| 8,475,933 B2 * | 7/2013 | Patel et al. | 428/523 |
| 2007/0275219 A1 * | 11/2007 | Patel et al. | 428/219 |
| 2011/0039082 A1 * | 2/2011 | Yun et al. | 428/213 |
| 2012/0231287 A1 * | 9/2012 | Patel et al. | 428/523 |
| 2013/0126592 A1 * | 5/2013 | Bellmore et al. | 229/117.27 |

* cited by examiner

*Primary Examiner* — N. Edwards
(74) *Attorney, Agent, or Firm* — The Watson I.P. Group, PLC; Jovan N. Jovanovic; Vladan M. Vasiljevic

(57) ABSTRACT

A bag in box packaging comprising an outer carton having a plurality of sides, thereby defining a cavity, and an inner bag having a wall structure comprising a plurality of layers of a co-extrusion. The inner bag being formed from at least one film having a plurality of seals to define a fluid tight configuration, the inner bag co-extrusion having a plurality of layers with a tie layer having at least 0.5% maleic anhydride-grafted polyethylene. Films made through an orientation process for bag in box packaging is likewise disclosed, as are manufacturing processes.

14 Claims, 3 Drawing Sheets

COEXTRUDED FILM AND BAGS MADE THEREFROM SUITABLE FOR BAG IN BOX CONTAINERS AND METHOD OF MANUFACTURING THE COEXTRUDED FILM

CROSS-REFERENCE TO RELATED APPLICATION

The present application claims priority from U.S. Prov. Pat. App. Ser. No. 61/549,435 entitled "COEXTRUDED FILM AND BAGS MADE THEREFROM SUITABLE FOR BAG IN BOX CONTAINERS AND METHOD OF MANUFACTURING THE COEXTRUDED FILM" filed Oct. 20, 2011, the entire specification of which is hereby incorporated by reference in its entirety.

BACKGROUND OF THE DISCLOSURE

1. Field of the Disclosure

The disclosure relates in general to bag in box packaging, and more particularly, to coextruded film and bags made from coextruded film suitable for bag in box containers. The disclosure is also directed to a method of manufacturing the coextruded film.

2. Background Art

The use bag in box is well known in the art. Bag in box packaging comprises a flexible bag (typically formed from a polymer based film) that is positioned within a rigid outer container, or box. The flexible bag often includes a spout to which a dispensing fitment is attached. Often, the rigid outer container includes an opening through which the dispensing fitment can be accessed.

A number of different materials are shipped in such containers. Typically the materials comprise flowable materials (i.e., liquids, gels, etc.) that have a predetermined viscosity. The flowable materials may include syrups, gels, liquids, purees, among other materials.

A number of different considerations are required for the bags. Often the flowable material is susceptible to degradation upon exposure to different chemicals and elements. For example, many food products are susceptible to degradation due to oxygen contamination or exposure. Additionally, different polymers can impart changes to the taste of the flowable material, which can be problematic (i.e., negatively impacting the taste of wine and the like). Thus, the materials from which the films are formed are quite significant.

Additionally, bag in box packaging is often transported vast distances by sea, land, air and rail. The flowable material moves within the bag, and the bag moves within the liner. Such repetitive micro-movements can result in pin-hole leaks caused by stress cracking.

Furthermore, such bags are typically formed by overlaying layers of film and sealing the films to each other to form a fluid-tight cavity. Such seals are often exposed to stress concentrations if the bag or the box having the bag therewithin is dropped or mishandled.

Due to all of these different hazards associated with the storage, filling, transport and handling of bag in box containers, the films associated with the bags thereof are highly specialized and engineered films of material. Often these films comprise coextrusions of various different layers of polymers which are in many instances laminated to other coextrusions of layers of polymers to provide the necessary performance.

Problematically, the formation of the different films can be quite costly. In certain situations it may be necessary to form several coextrusions, and then it may be necessary to laminate these coextrusions to each other. In other instances, it may be necessary to transport partially finished film for later lamination to other partially finished film.

It is an object of the present invention to provide an improved film that can be made through an orientation process, such as triple bubble.

It is another object of the present invention to improve film materials while facilitating the formation of the film materials through unified processes eliminating at least one lamination step.

These objects as well as other objects of the present invention will become apparent in light of the present specification, claims, and drawings.

SUMMARY OF THE DISCLOSURE

The disclosure is directed to a bag in box packaging comprising an outer carton and an inner bag. The outer carton comprises a plurality of sides which define a cavity. The inner bag comprises a wall structure comprising a plurality of layers of a co-extrusion. The inner bag is formed from at least one film having a plurality of seals to define a fluid tight configuration. The inner bag comprises a multi-layer coextrusion that has been stretched in at least a first direction. The multi-layer coextrusion has at least one tie layer comprising at least 0.50% maleic anhydride-grafted polyethylene.

In a preferred embodiment, the bag further comprises at least one EVOH layer coupled to the at least one tie layer.

In a preferred embodiment, the bag further comprises at least one Nylon blend layer coupled to the at least one tie layer.

In another preferred embodiment, the bag further comprises a five layer coextrusion comprising a first PE layer, a third EVOH layer and a fifth PE layer, with the second layer extending between the first and third layer, and the fourth layer extending between the third and fifth layer. The second layer comprises the at least one tie layer, and the fourth layer comprises a second tie layer having at least 0.50% maleic anhydride-grafted polyethylene.

In another preferred embodiment, the bag further comprises a five layer coextrusion comprising a first PE layer, a third EVOH and nylon blend layer and a fifth PE layer, with the second layer extending between the first and third layer, and the fourth layer extending between the third and fifth layer. The second layer comprises the at least one tie layer, and the fourth layer comprises a second tie layer having at least 0.50% maleic anhydride-grafted polyethylene.

In another preferred embodiment, the bag further comprises a five layer coextrusion comprising a first nylon blend layer, a third EVOH layer and a fifth PE layer, with the second layer extending between the first and third layer, and the fourth layer extending between the third and fifth layer. The second layer comprises the at least one tie layer, and the fourth layer comprises a second tie layer having at least 0.50% maleic anhydride-grafted polyethylene.

In a preferred embodiment the fifth layer comprises the thickest layer of the coextrusion.

In another preferred embodiment, the coextrusion is formed in a double bubble process.

In another preferred embodiment, the coextrusion is formed in a triple bubble process.

In yet another preferred embodiment, the coextrusion is formed in an orientation process.

Preferably, the at least one tie layer comprises at least 0.65% maleic anhydride-grafted polyethylene.

In another aspect of the invention, a bag for use in association with a bag in box package is defined.

BRIEF DESCRIPTION OF THE DRAWINGS

The disclosure will now be described with reference to the drawings wherein.

DETAILED DESCRIPTION OF THE DISCLOSURE

Figure 1:
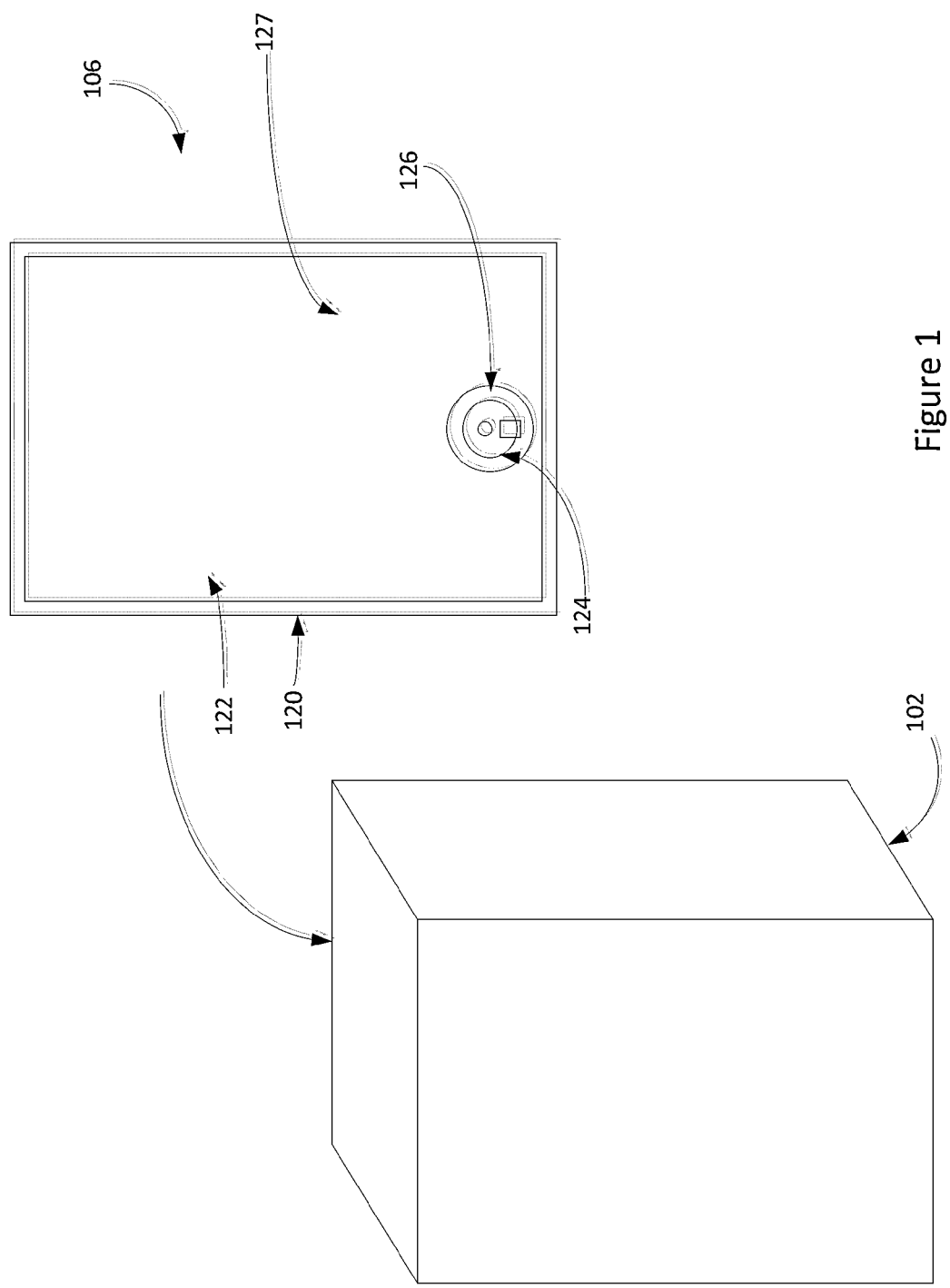
FIG. 1 of the drawings is a schematic representation of a bag in box packaging container of the type with which the film of the present invention can be utilized.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

The disclosure is directed to a formation of films and bags for use in bag in box containers which is formed through a cast tentered, double bubble or triple bubble process, to yield an inexpensive, yet high performance film. A typical bag in box container is shown in FIG. 1 as including an outer carton and an inner bag. The film of the present disclosure is suitable for the formation of a polymer bag that is currently made from multiple layers of material that are sealed together at seams to form a substantially fluid-tight bag that can be placed and utilized in such bag in box applications.

Such a bag in box packaging includes an outer box 102 and an inner bag 106. The outer box includes a plurality of panels to render a substantially a rectangular cubic configuration. Of course, other configurations are likewise contemplated. The inner bag 106 includes a top panel 120 and a bottom panel 122. A plurality of seals 124 extend around a perimeter of the panels so as to couple the two panels to each other, and, in turn, to define a cavity 127. A spout 124 having a flange 126 is coupled thereto and in communication with an opening in the top panel. Thus, the spout 124 provides access to the cavity 127. A spigot, tap or other fitment may be coupled to the spout 124 to facilitate the selective withdrawal of fluid from within the bag. The bag is positioned within the outer box with the fitment being accessible therethrough.

Figure 2:
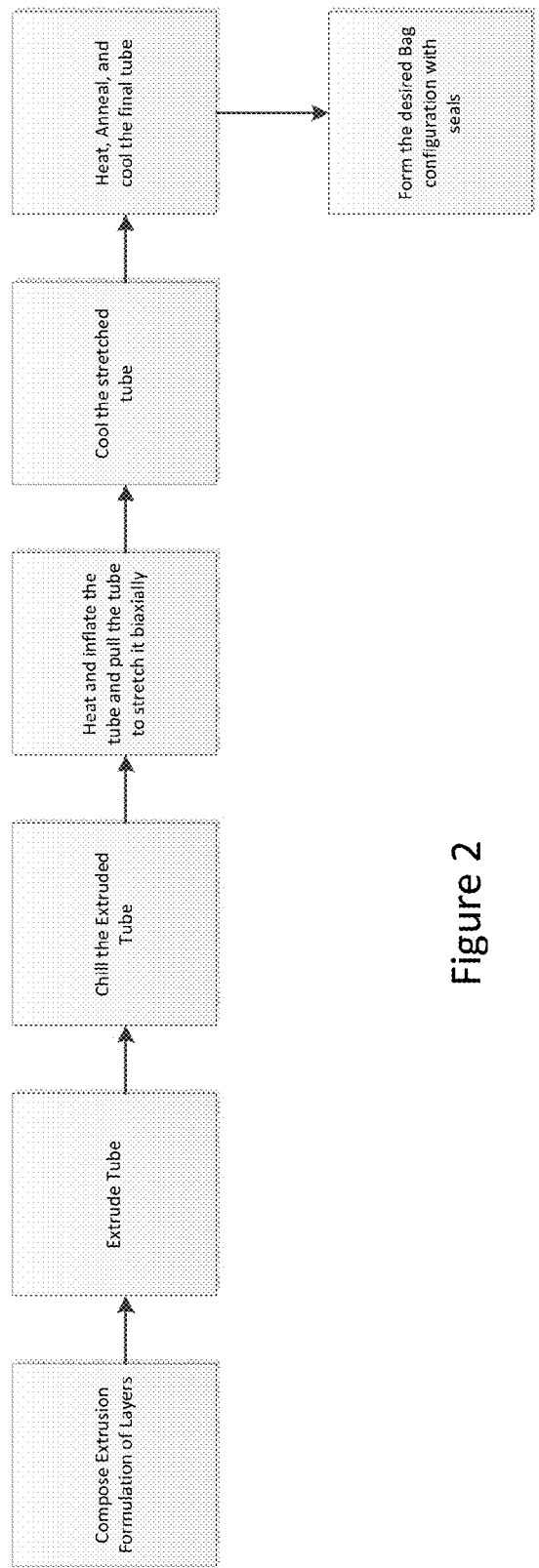
FIG. 2 of the drawings is a flow chart of a typical triple bubble process.

Typically, biaxial films can be produced in a cast tentered, double bubble or triple bubble process. With reference to FIG. 2, in a typical triple bubble film production, a polymer is extruded as a single or multiple layer material into a circular or annular die to form a tube of material. The tube of material is, at this stage, relatively thick. The tube is then formed to a predetermined, desired diameter or cross-sectional area, at which time it is quenched. Often such quenching comprises a water bath at, for example, 5° C.

The cooled tubular polymer extrusion is then heated to a desired temperature and air, or other suitable gas, is blown into the tube to stretch the tubular extrusion in a transverse direction. At the same time, through the use of rollers, the tubular extrusion is pulled in a longitudinal direction to effectuate a longitudinal stretch of the material. By carefully coordinating pressure of the gas within the tube and the rate of longitudinal movement, the film can be biaxially oriented as desired.

Once the material is stretched as desired to the desired length and diameter, the material is again inflated within the tube and heated to a predetermined temperature. The material is left in such an orientation to anneal the material, and to remove any residual stresses within the material. While the annealing step removes residual stresses, the biaxial orientation of the film is maintained.

Once the annealing step is completed, the film can be wound onto a roll in a tubular configuration, it can be slit on one side to result in a wide film (that can be wound in a folded orientation), or it can be slit on both sides which results in two separate films.

In contrast, to the triple bubble process that is described above, the double bubble process typically omits the third bubble for purposes of annealing. Instead, the material is oriented in the second bubble and retained in the oriented and unannealed condition throughout winding.

A number of manufacturers of equipment for producing triple bubble (or double bubble) films are known. These include Macro Engineering of Ontario, Canada, Techno Coating Engineering of Italy, Kuhne of Germany, Guangdong Jin Ming Machinery Co. of China, among others. The equipment from these manufacturers are capable of manufacturing films of, for example, 5 layer, 7 layer, 9 layer and 11 layer co-extrusions.

The use of such films is known in the art with respect to sausage casings and with respect to shrinkwrap films. Typically, the films produced from such processes are limited to use in association with shrink wrap materials. The use thereof with respect to bag in box packaging has not been contemplated, substantially due to the difficulties associated with shrinkage, and with respect to failure to meet the strict requirements needed for film performance in bag in box packaging.

Figure 3:
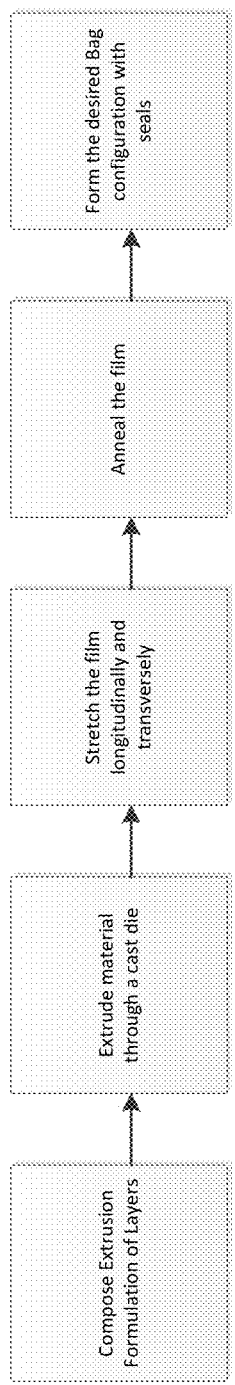
FIG. 3 of the drawings is a flow chart of a typical orientation process, such as cast tentered.

In a cast tentered process, and with reference to FIG. 3, it is first necessary to first compose the formulation of layers. Once these are formulated, the formulation is extruded through a cast die. The film is then stretched longitudinally and transversely. In the longitudinal direction the stretching is accomplished through the use of rollers. In the transverse direction, these are achieved through the use of clips on diverging rails. The longitudinal and transverse stretching can be accomplished simultaneously or sequentially. Once the film has been stretched, it is annealed. Finally, the desired bag configuration can be formed with the necessary seals.

A number of manufacturers of equipment for producing cast tentered films are known. These include Parkinson Technologies of USA (Rhode Island) and Brueckner Group of Germany, among others. The equipment from these manufacturers are capable of manufacturing films of, for example, 5 layer, 7 layer, 9 layer, and 11 layer co-extrusions.

It has been found that with modification of the film constituents, the equipment and processes heretofore utilized in the prior art, oriented films can be formed that can be made suitable for use in association with bag in box packaging.

Amongst other problems, the tie layer has been found to be problematic, as has the differences in the melting and transition temperatures for the different layers.

In response thereto, a relatively low percentage MAH-gPE is combined with a MAH-gPE concentrate so as to increase the concentration of the tie layer components. In other embodiments, MAH-gPE can be obtained in different manners. It is believed that the percentage of MAH-gPE is above 0.5% for a bag in box package having such a construction.

Also in response thereto, it is believed that the addition of LDPE to lower the melting temperature of LLDPE and utilizing a lower temperature nylon. In turn, the different co-extrusion layers can be coordinated relative to each other. As such, a number of different types of nylon are contemplated, including Nylon 6, 66; a nylon 6, 66 with a lower modulus, Nylon 6 blended with amorphous Nylon, and amorphous Nylon as a stand-alone layer.

The following formulations were developed and will be tested relative to product requirements. In the particular field of bag in box packaging, the requirements that must be met are an oxygen transmission rate (OTR) which is less than 0.10 cc/m$^2$/day/atm at 90% relative humidity inside the bag and 50% relative humidity outside of the bag. Additionally, when 2000 Gelbo flex cycles are conducted, the film must have less than 10 holes. Finally, a bag made from the film must survive at least 3 drops from 40" before failure. To date, it is believed that no such film has been developed that has passed each of the foregoing requirements. These foregoing requirements are herein defined as "bag in box requirements." The OTR requirement is often not needed for certain materials, in that the materials contained within the bag are not particularly susceptible to damage from oxygen.

The following film constructions have been developed, with the particular intent of having the films made into bags for the production of bag in box packaging. Each of these formulations is asymmetrical, although not required to be so made. Advantageously, to make an asymmetrical configuration, the outer layer in the triple bubble process becomes the product contact surface in the bag in box configuration. Advantageously, as the product contact layer is typically thicker and the outer layer can be made thinner, if the product contact layer is made on the outside of the triple bubble, the inner layer can be made thinner without adverse problems. Reversing the same can result in problems associated with the thermal load on the different components resulting in problems.

Example 1

In a first example, the first layer comprises a Polyethylene (PE) blended layer of a thickness of approximately 0.51 mils. The second layer comprises a 0.65% maleic anhydride-grafted polyethylene (PE-g-MAH) tie layer (which may comprise a LDPE or otherwise) at a thickness of 0.51 mils. The third layer comprises an orientatable EVOH material at a thickness of 0.34 mils. The fourth layer comprises another tie layer comprising a 0.65% PE-g-MAH at a thickness of 0.51 mils. The fifth and final layer comprises a PE blended skin layer of a thickness of approximately 1.52 mils. Thus, the overall thickness of the film is 3.39 mils.

Example 2

In the second example, the first layer comprises a PE blended layer of a thickness of approximately 0.51 mils. The second layer comprises a 0.65% PE-g-MAH layer at a thickness of 0.51 mils. The third layer comprises a 70/30 blended ratio of orientatable EVOH and nylon terpolymer at a thickness of 0.34 mils. The fourth layer comprises a 0.65% PE-g-MAH layer at a thickness of 0.51 mils. The fifth layer comprises a PE blended layer of a thickness of approximately 1.52 mils. Thus, the overall thickness of the film is 3.39.

Example 3

In the third example, the first layer comprises a Nylon blend of a thickness of approximately 0.76 mils. The second layer comprises a 0.65% PE-g-MAH layer at a thickness of 0.28 mils. The third layer comprises an orientatable EVOH at a thickness of 0.22 mils. The fourth layer comprises a 0.65% PE-g-MAH layer at a thickness of 0.28 mils. The fifth layer comprises a PE blended layer of a thickness of approximately 1.26 mils. Thus, the overall thickness of the film is 2.80.

The third sample was tested and could successfully pass both the drop test and the Gelbo flex crack tests. Specifically, the tested bags generally had virtually no holes after 2000 cycles. A 3 liter bag was filled with water and the drop test was initiated. A number of the bags were able to pass with in excess of five drops with some bags passing a total of ten drops each.

In each example there are five layers, two of which are tie layers. The different formulations vary the nylon layer materials and the tie layer formulations. In particular, the first four examples have generally the same configuration with the only variation being the nylon layer and the EVOH layer, as well as the relative thicknesses of the layers.

Additionally, it will be understood that the different layers can be varied, as can the layer ratios. For example, while the layer ratios in the examples are the same, the application is not limited thereto. Moreover, it is not limited to those particular layers, or the particular quantity of layers that is shown. It is contemplated that the structures can be found which can be suitable replacements for DuraTech 34 and DuraShield 45 which are commercially available from Scholle Corporation of Irvine, Calif. Of course, the invention is not limited to such constructions, and the principles of the invention can be utilized to configure different configurations of layers in the co-extrusion of oriented films.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A bag in box packaging comprising:
an outer carton having a plurality of sides, thereby defining a cavity;
an inner bag having a wall structure comprising a plurality of layers of a co-extrusion, the inner bag being formed from at least one film having a plurality of seals to define a fluid tight configuration, the inner bag comprising a biaxially oriented multi-layer coextrusion, the multi-layer coextrusion having at least one tie layer comprising a low density polyethylene and a linear low density polyethylene with at least 0.50% maleic anhydride-grafted polyethylene.

2. The bag in box packaging of claim 1 further comprising at least one EVOH layer coupled to the at least one tie layer.

3. The bag in box packaging of claim 1 further comprising at least one Nylon blend layer coupled to the at least one tie layer.

4. The bag in box packaging of claim 1 further comprising a five layer coextrusion comprising a first PE layer, a third EVOH layer and a fifth PE layer, with the second layer extending between the first and third layer, and the fourth layer extending between the third and fifth layer, wherein the second layer comprises the at least one tie layer, and the fourth layer comprises a second tie layer comprising a low density polyethylene and a linear low density polyethylene with at least 0.50% maleic anhydride-grafted polyethylene.

5. The bag in box packaging of claim 1 comprising a five layer coextrusion comprising a first PE layer, a third EVOH and nylon blend layer and a fifth PE layer, with the second layer extending between the first and third layer, and the fourth layer extending between the third and fifth layer, wherein the second layer comprises the at least one tie layer, and the fourth layer comprises a second tie layer comprising a low density polyethylene and a linear low density polyethylene with at least 0.50% maleic anhydride-grafted polyethylene.

6. The bag in box packaging of claim 1 comprising a five layer coextrusion comprising a first nylon blend layer, a third EVOH layer and a fifth PE layer, with the second layer extending between the first and third layer, and the fourth layer extending between the third and fifth layer, wherein the second layer comprises the at least one tie layer, and the fourth layer comprises a second tie layer comprising a low density polyethylene and a linear low density polyethylene with at least 0.50% maleic anhydride-grafted polyethylene.

7. The bag in box packaging of claim 4 wherein each layer has a thickness, the thickness of the fifth layer is greater than the thickness of the first layer, the second layer, the third layer and the fourth layer.

8. The bag in box packaging of claim 5 wherein each layer has a thickness, the thickness of the fifth layer is greater than the thickness of the first layer, the second layer, the third layer and the fourth layer.

9. The bag in box packaging of claim 6 wherein each layer has a thickness, the thickness of the fifth layer is greater than the thickness of the first layer, the second layer, the third layer and the fourth layer.

10. The bag in box packaging of claim 1 wherein the coextrusion is formed in a double bubble process.

11. The bag in box packaging of claim 1 wherein the coextrusion is formed in a triple bubble process.

12. The bag in box packaging of claim 1 wherein the coextrusion is formed in an orientation process.

13. The bag in box packaging of claim 1 wherein the at least one tie layer comprises a low density poly ethylene and a linear low density polyethylene with at least 0.65% maleic anhydride-grafted polyethylene.

14. A bag for bag in box packaging comprising an inner bag having a top panel and a bottom panel, the top and bottom panel sealed together with a plurality of seals to define a cavity, the top and bottom panels each comprising a wall structure comprising a plurality of layers of a co-extrusion, the inner bag being formed from at least one film having a plurality of seals to define a fluid tight configuration, the inner bag comprising a multi-layer coextrusion that has been stretched in at least a first direction, the multi-layer coextrusion having at least one tie layer comprising a low density poly ethylene and a linear low density polyethylene with at least 0.50% maleic anhydride-grafted polyethylene.

* * * * *